US006247551B1

(12) United States Patent
Heron

(10) Patent No.: US 6,247,551 B1

(45) **Date of Patent: *Jun. 19, 2001**

(54) PANEL-FORM LOUDSPEAKER

(75) Inventor: Kenneth H Heron, Farnborough (GB)

(73) Assignee: The Secretary of State for Defence in Her Britannic Majesty's Government of the United Kingdom of Great Britain and Northern Ireland, Farnborough (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 09/114,093

(22) Filed: Jul. 13, 1998

Related U.S. Application Data

(62) Continuation of application No. 08/723,932, filed on Oct. 1, 1996, now abandoned, which is a continuation of application No. 08/337,367, filed on Nov. 8, 1994, now abandoned, which is a continuation of application No. 07/983,592, filed as application No. PCT/GB91/01262 on Jul. 26, 1991, now abandoned.

(30) Foreign Application Priority Data

| | | |
|---|---|---|
| Aug. 4, 1990 | (GB) | 9017133 |
| Feb. 26, 1991 | (GB) | 9103969 |

(51) Int. Cl.[7] .................... G01K 13/00

(52) U.S. Cl. .................... 181/173; 181/170; 381/431; 381/425

(58) Field of Search .................... 181/160, 170, 181/173, 157; 381/423, 425, 431

(56) References Cited

U.S. PATENT DOCUMENTS

| | | |
|---|---|---|
| 3,187,116 | 6/1965 | Sears et al. . |
| 3,247,925 | 4/1966 | Warnaka . |

(List continued on next page.)

FOREIGN PATENT DOCUMENTS

| | | |
|---|---|---|
| 0 114 910 | 8/1984 | (EP) . |
| 2 408 168 | 6/1979 | (FR) . |
| 931080 | 7/1963 | (GB) . |
| 2 010 637 | 6/1979 | (GB) . |

(List continued on next page.)

OTHER PUBLICATIONS

Rossing, Thomas D. et al., "Nonlinear Vibrations in Plates and Gongs", Journal of the Acoustical Society of America, vol. 73, No. 1, Jan. 1983, pp. 345–351.

Waterhouse, Richard V. et al., "Sampling Statistics for Vibrating Rectangular Plates", Journal of the Acoustical Society of America, vol. 72, No. 6, Dec. 1982, pp. 1863–1869.

*Primary Examiner*—Khanh Dang

(74) *Attorney, Agent, or Firm*—Nixon & Vanderhye P.C.

(57) ABSTRACT

A panel-form loudspeaker has a resonant multi-mode radiator panel which is excited at frequencies above the fundamental frequency and the coincidence frequency of the panel to provide high radiation efficiency through multi-modal motions within the panel, in contrast to the pistonic motions required of conventional loudspeakers. The radiator panel is skinned composite with a honeycomb or similar core and must be such that it has a ratio of bending stiffness to the third power of panel mass per unit area (in mks units) of at least 10 and preferably at least 100. An aluminum skinned, aluminum honeycomb cored composite can meet this more severe criterion easily.

4 Claims, 2 Drawing Sheets

U.S. PATENT DOCUMENTS

| | | |
|---|---|---|
| 3,272,281 | 9/1966 | Rutter . |
| 3,347,335 | 10/1967 | Watters et al. . |
| 4,198,550 | 4/1980 | Matsuda et al. . |
| 4,271,498 | 6/1981 | Zafferri et al. . |
| 4,272,653 | 6/1981 | Osato et al. . |
| 4,291,205 | 9/1981 | Kamon et al. . |
| 4,300,655 | 11/1981 | Sakamoto et al. . |
| 4,322,583 | 3/1982 | Maeda . |
| 4,385,210 | 5/1983 | Marquiss . |
| 4,392,027 | 7/1983 | Bock . |
| 4,408,678 | 10/1983 | White, Jr. . |

FOREIGN PATENT DOCUMENTS

| | | |
|---|---|---|
| 2 023 375 | 12/1979 | (GB) . |
| 2 115 646 | 9/1983 | (GB) . |
| 4-157900 | 5/1992 | (JP) . |
| 6-30488 | 2/1994 | (JP) . |
| 1658421 | 6/1991 | (SU) . |

PANEL-FORM LOUDSPEAKER

This is a continuation of application Ser. No. 08/723,932, filed Oct. 1, 1996, now abandoned, which is a continuation of application Ser. No. 08/337,367, filed Nov. 8, 1994, abandoned; which is a continuation of application Ser. No. 07/983,592, filed Feb. 4, 1993, abandoned, which is a 371 of PCT/GB91/01262, filed Jul. 26, 1991.

BACKGROUND OF THE INVENTION

1. Field of the Invention

This invention relates to a panel-form loudspeaker utilising a resonant multi-mode radiator, which is suitable for applications requiring thin speaker sections such as in public address loudspeakers. The speaker exhibits a conversion efficiency approaching unity so it is suitable for applications requiring high acoustic power output from the loudspeaker.

2. Discussion of Prior Art

Current loudspeakers utilise a diaphragm or similar element which is caused to move in a gross fashion in an essentially pistonic manner to create the acoustic output. The motion of the diaphragm should be in-phase across its surface so that the diaphragm moves backwards and forwards in response to the driver actuation and this is achieved, inter alia, by the nature and size of the diaphragm in relation to the frequency band over which the loudspeaker is required to operate. In these loudspeakers the diaphragm operates largely at frequencies below those at which it exhibits resonant modes (though typically they can operate above the first resonant frequency of the diaphragm by suitably damping-out this mode) and this imposes spatial and/or frequency limitations upon the loudspeaker which are undesirable. In order to raise the threshold of resonant frequencies small diaphragms are used but these are not efficient radiators at low frequencies.

There are two main kinds of loudspeaker in current use and both of these utilise a diaphragm driven in pistonic manner. The first of these is the electrostatic loudspeaker in which the diaphragm is driven by the charge difference experienced between the diaphragm and a rigid backplate closely spaced behind the diaphragm. Electrostatic loudspeakers are capable of yielding a high fidelity output across a wide frequency band and they are of relatively planar configuration suitable for public address applications. However they are expensive and have very low conversion efficiency which detracts from their advantages. The other established form of pistonic-diaphragm loudspeaker is the conventional dynamic loudspeaker which incorporates an edge mounted diaphragm driven by an electro-mechanical driver. These loudspeakers have relatively narrow bandwidth and although they are more efficient radiators than the electrostatic loudspeakers they still have low conversion efficiency. In loudspeakers of this form is necessary to prevent destructive interference between the forward and rearward outputs of the diaphragm. This usually requires that the diaphragm be mounted in the front face of a substantial box housing and consequently precludes flat panel formats.

SUMMARY OF THE INVENTION

It is an aim of the present invention to provide a high conversion efficiency flat panel-form loudspeaker having a frequency band at least adequate for public address purposes. This is achieved by making use of the possibilities offered by certain modern composite panels to produce a loudspeaker which operates in a novel way. Composite panels comprising thin structural skins between which is sandwiched a light spacing core are commonly used for aerospace structures for example and certain of these may be used in the speaker as claimed herein. Certain sandwich panel materials have been used previously in the construction of diaphragms in conventional dynamic loudspeakers, eg as disclosed in patent specifications GB 2010637A; GB 2031 691A; and GB 2023375A, but have not been used, to our knowledge, in the manner of this invention as resonant multi-mode radiators.

The invention claimed herein is a panel-form loudspeaker comprising:

a resonant multi-mode radiator element being a unitary sandwich panel formed of two skins of material with a spacing core of transverse cellular construction. wherein the panel is such as to have ratio T of bending stiffness (B) in Nm to the cube power of panel mass per unit surface area ($\mu$) in $kg/m^2$ in all orientations of at least 10 $Nm^7/kg^2$, i.e., $T=B/\mu^3\geqq 10$;

a mounting means which supports the panel or attaches it to a supporting body, in a free undamped manner;

and an electro-mechanical drive means coupled to the panel which serves to excite a multi-modal resonance in the radiator panel in response to an electrical input within a working frequency band for the loudspeaker.

The term "transverse cellular construction" as used in the above definition and elsewhere in the specification refers to honeycomb core forms and other cellular based core constructions having non-hexagonal core sections with core cells extending through the thickness of the panel material.

In the above definition of the invention and throughout the specification and claims all units used are MKS units, specifically Nm and $kg/m^2$ in the above paragraph. We term the value of the above-given ratio "T" and a T value as specified above is necessary in order that the radiator panel might function properly in the manner required. Preferably the value of T should be at least 100. This T value is a measure of the acoustic conversion efficiency of the radiator panel when the loudspeaker is operating as intended at frequencies above its coincidence frequency (see below). A high T value is best achieved by use of honeycomb cored panels having thin metal skins. Our presently preferred panel type is those panels having honeycomb core construction and thin skins with both skins and core being of aluminium or aluminium alloy. With such panels T values of 200 or more can be achieved. It is most unlikely that any solid plate material could provide the required minimum value of T. A solid steel panel of any thickness would have a T value of about 0.5, well below that required. Solid carbon fibre reinforced plastics sheets with equi-axed reinforcement would have a T value around 0.85, still well short of the minimum requirement. The mode of operation of the speaker as claimed is fundamentally different from prior art diaphragm loudspeakers which have an essentially "pistonic" diaphragm motion. As mentioned previously such loudspeakers are intended to produce a reciprocating and in-phase motion of the diaphragm and seek to avoid modal resonant motions in the diaphragm by design of the diaphragm to exclude them from the loudspeaker frequency band and/or by incorporating suitable damping to suppress them. In contrast the present invention does not incorporate any conventional diaphragm but rather uses a panel, meeting the criteria described, as a multi-mode radiator which functions through the excitation of resonant modes in the panel not by forcing it to move in a pistonic, non-resonant manner. This difference in mode of operation follows from the panel stiffness to mass criterion, from the avoidance of edge damping and the absence of internal damping layers etc within the radiator panel, and also from operation of the radiator at frequencies above both the coincidence frequency and the fundamental frequency of the composite panel.

The "coincidence frequency" is the frequency at which the bending wave speed in the radiator panel matches the speed of sound in air. This frequency is of the manner of a threshold for efficient operation of the loudspeaker for at frequencies above their coincidence frequency many modern composite sandwich panels radiate efficiently. It is possible using the information provided herein to produce a radiator panel suitable for given frequency bands in which the concidence frequency of the radiator panel will fall at or below the required bandwidth so that the loudspeaker will convert almost all mechanical input from the electro-mechanical drive means into acoustic output. This is more than a mere desideratum for it is this characteristic of high conversion efficiency which overcomes potential problems in a resonant multi-mode radiator based system. A high conversion efficiency (which can be achieved by suitable selection of materials in accordance with the design rules given herein) is achieved when panel motions are constrained by acoustic damping rather than internal structural damping within the panel material or damping imposed by virtue of the panel mounting. When this is achieved acoustic distortions will be small.

The value of "B" in the above given "T" criterion is the static bending stiffness of the panel rather than the stiffness of the panel when subjected to rapid flexure. However the bending stiffness reduces with increasing frequency due to the increasing influence of shear motions within the core. It is important that the effect of this shear motion is minimised, and this can be achieved by the use of a panel with a sufficiently high shear modulus. This requirement leads to a second criterion which is that the core shear modulus (G) should be not less than the value given by the relationship: $\mu c^2/d$; where "c" is the speed of sound in air and "d" is the depth of the panel core. It is convenient to re-arrange this expression to the alternative formulation: $\mu.c^2/d.G \leqq 1$.

BRIEF DESCRIPTION OF THE DRAWINGS

Two exemplary forms of the invention are described below by way of example, with reference to the drawings of which.

DETAILED DISCUSSION OF PREFERRED EMBODIMENTS

Figure 1:
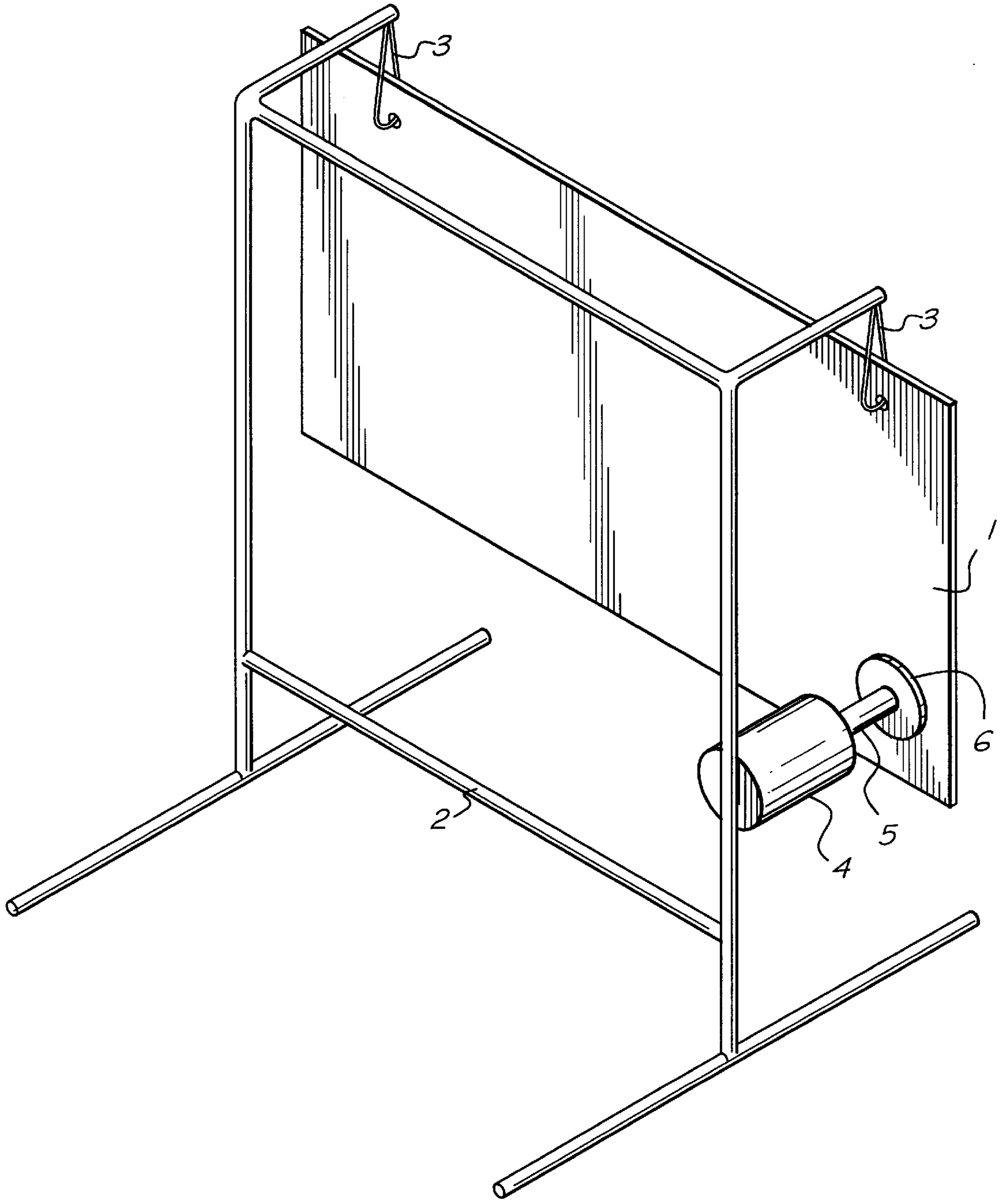
FIG. 1 is an isometric view from the rear of a frame-mounted loudspeaker.

The loudspeaker as illustrated in FIG. 1 comprises a resonant multi-mode radiator 1, a simple support frame 2 from which the radiator is suspended by means of suspension loops 3, and an electro-mechanical exciter 4. The radiator 1 comprises a rectangular panel of aluminium alloy-skinned, aluminium alloy honeycomb sandwich construction. Details of the panel and sizing rules etc are given later. The electromagnetic exciter 4 has a shaft 5 and is mounted upon the support frame 2 such that this shaft 5 bears against the rear of the radiator panel 1 and excites the latter by a reciprocating movement of the shaft when an electrical signal is supplied to the exciter 4. At the point of contact between the shaft 5 and the panel the latter is reinforced by a patch 6 to resist wear and damage. The exciter 4 is positioned such that it excites the radiator panel 1 at a position thereon close to one of its corners not at a position close to its centre point to avoid exciting the panel preferentially in its symmetrical modes. The inertial masses of the exciter 4 and the radiator panel 1 are matched to secure an efficient inertial coupling between the two for efficient power transfer.

Figure 2:
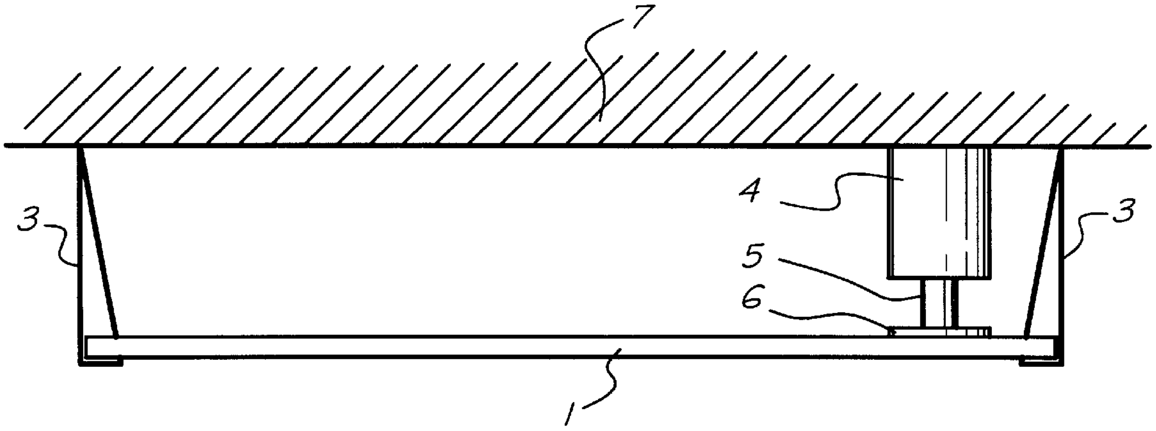
FIG. 2 is a lateral view of a ceiling mounted loudspeaker.

The second version of the loudspeaker, which is depicted in FIG. 2. is the like of that described above with reference to FIG. 1 save in some minor details mentioned below. Common reference numerals are used for common parts in the two figures.

This version of loudspeaker is suspended from a ceiling 7 rather than a support frame. Four suspension loops 3 are used instead of two in the previous version, so that the radiator panel 1 underlies the ceiling rather than hanging down from it. The exciter 4 is positioned above the radiator 1.

Both versions of the loudspeaker operate in exactly the same way and are subject to the same design rules regarding selection of panel materials and construction and dimensioning of the panel having regard to the required frequency band of the loudspeaker.

The "T" criterion and the shear modulus criterion, both of which have been mentioned previously relate to panel forms and panel materials rather than panel dimensions and loudspeaker frequency ranges. To produce a speaker optimised for a particular frequency range it is useful to refer to some design rules which are given below.

The low end of the desired frequency range of the loudspeaker sets a limit upon the fundamental frequency of the panel for this must be below the lowest frequency of interest. Moreover the coincidence frequency of the panel should also be below the lowest frequencies of interest. The coincidence frequency ($f_c$) is independent of panel area and is given by the expression:

$$f_c^2 \approx \mu.c^4/4.\pi^2.B$$

The desired bandwidth for a particular speaker sets a value of $f_c$ and hence establishes a relationship between $\mu$ and B. If a value of the fundamental frequency ($f_1$) is also set then this fixes an approximate value for the area of the panel for $f_1$ is given by the approximate expression:

$$f_1^2 \approx B/\mu.A^2$$

Finally, the frequency at which the first air resonance occurs within the core of the panel should be above the upper frequency limit of the loudspeaker. This frequency ($f_a$) is given by another expression:

$$f_a = c/2.d$$

where d is the depth of the panel core. Hence this expression fixes the depth of the panel core according to the frequency bandwidth of the loudspeaker.

Figure 3:
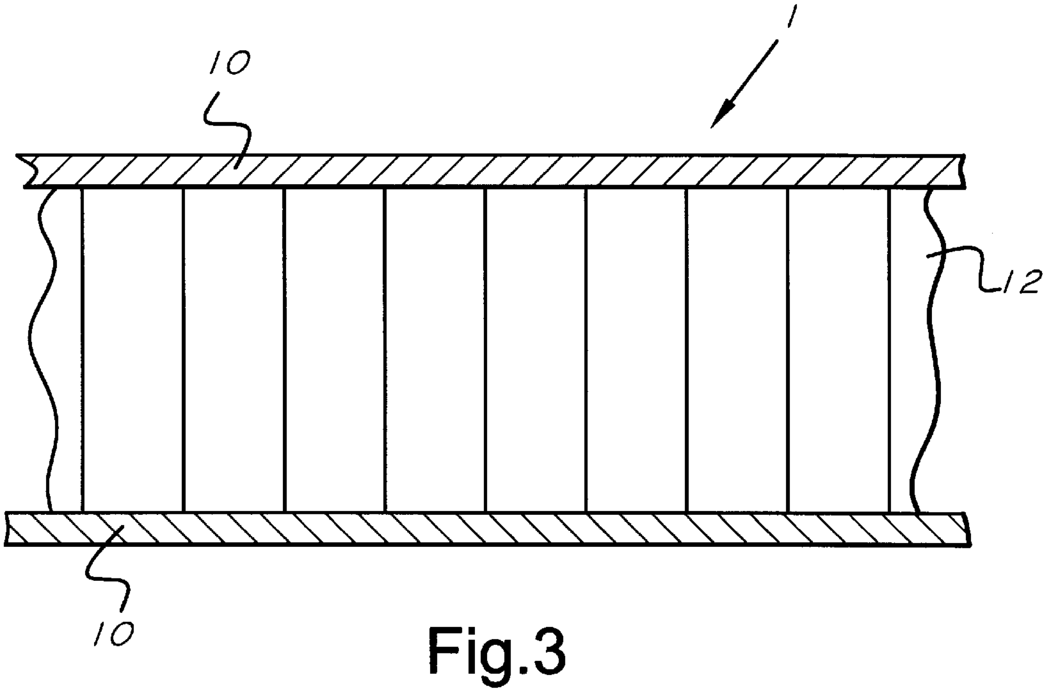
FIG. 3 is a side cross-sectional view of the panel sandwich.

FIG. 3 illustrates the construction of panel 1 having material skins 10 which sandwich a transverse cellular core 12.

Design considerations are illustrated by way of example below with reference to one version of the loudspeaker which utilises a radiator panel comprising a 1 m×1 m square of aluminium skinned, aluminium honeycomb cored composite. The core depth for the panel is 0.04 m and the thickness of each skin is 0.0003 m. For this panel B is 18850 Nm. $\mu$ is 3.38 kg/m$^2$, and T is 488Nm$^7$ /kg$^2$.

From the $f_1$ equation, $f_1$ is $[18850/3.38\times1]^{1/2}$,=75 Hz.

From the $f_c$ equation, $f_c$ is $[3.38\times340^4/4\times3.1416^2\times18850]^{1/2}$=246 Hz.

From the $f_a$ equation, $f_a$ is 340/2×0.04=4250 Hz.

The shear stiffness of the panel varies with orientation within the plane of the panel. For the axis of the minimum value of "G" the expression: $\mu.c^2/G.d$ has a value of 0.056 and for the axis of of its maximum value the same expression has a value of 0.122. Both these values are much less than the limiting value of 1 and indicate that the loudspeaker will not be limited in performance across the intended frequency band by core shear motions.

From these calculations it would be expected that a loudspeaker as claimed utilising a radiator panel in the form of a 1 m square of the material detailed above would have a frequency bandwidth of 250 Hz to 4 kHz within which it would have a high conversion efficiency and low distortion. It is anticipated that such a bandwidth would be quite satisfactory for a public address loudspeaker.

What is claimed is:

1. A panel-form loudspeaker comprising:

a resonant multi-mode radiator element being a unitary sandwich panel formed of two skins of material with a spacing core of transverse cellular construction, wherein said panel has a quotient T of bending stiffness (B) in Nm, in all orientations, to the cube power of panel mass per unit surface area ($\mu$) in kg/m$^2$ of at least 10 Nm$^7$/kg$^2$;

a mounting means for supporting the panel in a free undamped manner;

and an electromechanical drive means coupled to the panel which serves to excite a multi-modal resonance in the sandwich panel in response to an electrical input within a working frequency band for the loudspeaker.

2. A panel-form loudspeaker as claimed in claim 1 in which the sandwich panel constituting the radiator element has a ratio T of at least 100 Nm$^7$/kg $^2$.

3. A panel-form loudspeaker as claimed in claim 1 in which the skins and core of the sandwich panel constituting the radiator element comprise aluminium or aluminium alloy.

4. A panel-form loudspeaker as claimed in claim 1 when the electro-mechanical drive means is supplied with an electrical drive signal having a fundamental frequency component, said panel having a first resonant frequency and a coincidence frequency, said fundamental frequency greater than said first resonant frequency and said coincidence frequency.

* * * * *